United States Patent [19]

van Heel

[11] 4,055,397
[45] Oct. 25, 1977

[54] APPARATUS FOR SEPARATING A SUBLIMATION PRODUCT FROM A GAS

[75] Inventor: Hubertus Johannes Gerardus van Heel, Vriezenveen, Netherlands

[73] Assignee: Ultra-Centrifuge Nederland N.V., The Hague, Netherlands

[21] Appl. No.: 693,960

[22] Filed: June 8, 1976

[30] Foreign Application Priority Data

June 26, 1975 Netherlands ............... 7507594

[51] Int. Cl.$^2$ .................................. B01D 7/02
[52] U.S. Cl. .......................... 23/264; 23/294 R; 165/142; 165/73; 165/74; 55/82
[58] Field of Search ............ 23/294, 264; 165/142, 165/73, 74; 55/82

[56] References Cited

U.S. PATENT DOCUMENTS

| 2,214,838 | 9/1940 | McGavock | 23/294 |
| 2,669,435 | 2/1954 | Cord et al. | 165/142 |
| 2,743,169 | 4/1956 | Hecker | 23/264 |

FOREIGN PATENT DOCUMENTS 1,091,694  11/1967  United Kingdom .............. 23/264

Primary Examiner—James H. Tayman, Jr.
Attorney, Agent, or Firm—Cushman, Darby & Cushman

[57] ABSTRACT

Apparatus for separating a sublimation product from a gas which contains this product in the form of vapor, comprising an elongate substantially horizontal casing having a gas inlet near one end and a gas outlet near the other end so that gas flows longitudinally through the casing; heat exchange means cooperating with the exterior of the wall of the casing for cooling said wall below the sublimation temperature during the subliming process, means for assuring that an open channel for gas flow is maintained during the subliming process, said means comprising at least one permanently heated, elongate, rod-shaped element fitted eccentrically in the casing, said element extending in the same direction as the casing and being placed in the upper part of the casing, said heating element being manufactured of a material having good heat-conducting properties and projecting into the casing through a wall portion over part of the length of the heating element so that heat can be supplied thereto from outside the casing.

1 Claim, 6 Drawing Figures

APPARATUS FOR SEPARATING A SUBLIMATION PRODUCT FROM A GAS

The invention relates to an apparatus for separating a sublimation product from a gas which contains this product in the form of vapour, comprising an elongate casing, the wall of which is provided on the outside with heat-exchanging means which cool this wall below the sublimation temperature during the subliming process, the gas flowing longitudinally through the casing.

The invention aims at so improving such an apparatus that the precipitate formed is distributed more uniformly than has been possible with prior-art systems. This aim is attained by fitting at least one permanently heated, elongate, rod-shaped element eccentrically in the casing, in such a way that this element extends in the same direction as this casing. This heating element preferably extends from an end wall of the casing over the greater part of the length of the casing, for example over about three quarters of the length. The aforementioned heat-exchanging means with which the wall of the casing is provided are in practice usually constituted by a coiled pipe arranged along and against the outside of the casing. This can be accomplished, for instance, in the form of a pipeline which is wound helically about the casing and which is brought into good heat-conducting contact with this casing. The passage of a coolant through this coiled pipe causes the inner wall of the casing to be adequately cooled as well, so that the sublimation product can settle upon it.

Under the action of the heating element, which extends longitudinally through the casing over the greater part of the length thereof, the temperature is raised locally to such an extent that no subliming can take place around this heating element. As a result, there always remains an open channel through which the gases can continue flowing through the apparatus, so that no clogging can occur.

According to a further improvement, the casing is arranged with the longitudinal axis in horizontal or substantially horizontal position, the eccentric heating element being placed in the upper part of the casing. These measures obviate the risk of lumps of sublimation product becoming suddenly detached, for example during subsequent heating-up of the apparatus, and, in falling, either damaging the internal parts of the apparatus or producing an abrupt difference in load, which could also be a source of damage.

For a clear understanding of the operation of the apparatus at issue, it is to be noted that a coolant, constituted, for example, by freon, is passed through the cooling coil which cools the outer wall of the casing. When gases containing the product to be sublimed in vapour form have flowed into the apparatus for some time, an amount of sublimation product has gradually settled upon the inner wall of the apparatus. As soon as this amount has reached a given maximum, the supply of gas flow is interrupted, and a heating medium is conveyed through the outer coil so that the sublimation product can melt or evaporate, allowing it to be readily removed.

According to a further improvement provided by the invention, the heating element is consituted by a pair of coaxial tubes extending into the casing over part of the length thereof, with the outer tube being closed at the end located within the casing, so that a heating medium can be supplied through the space between the outer and the inner tube, whereupon it is discharged through the inner tube. This measure favours the desired thermal gradient, while, furthermore, the advantage is obtained that only one passage has to be provided in the wall of the casing.

According to a variant of the invention, the heating element is manufactured of a material having good heat-conducting properties, heat being supplied to it outside the casing, preferably by electricity.

It furthermore is efficient to support the end of the heating element which extends freely within the casing upon a baffle structure which is installed at the end of the apparatus. This baffle structure causes the gases, prior to leaving the apparatus, to be exposed to a longer path length, so that any sublimation products which might still be contained in the gases are forced to precipitate.

An embodiment of the invention is explained further with the aid of the following figures, where FIG. 1 is a vertical longitudinal section through an apparatus according to the invention (as a view which is in part broken away);

Figure 1:
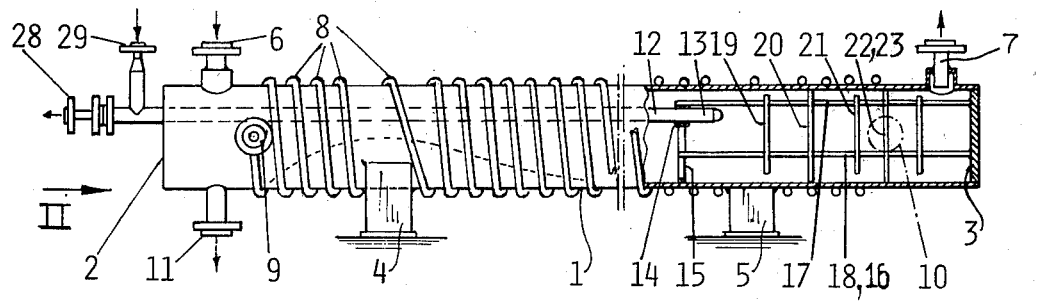
Figures 2, 3, 4, 5:
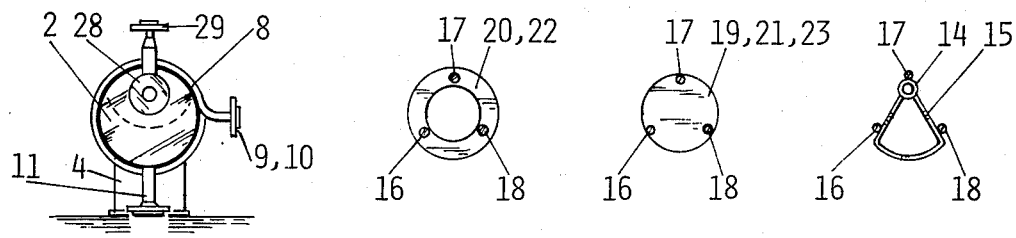
FIG. 2 is an end view along arrow II of the apparatus of FIG. 1.
FIGS. 3 and 4 are examples of baffles used in the baffle structure of the apparatus.
FIG. 5 shows a supporting member of the baffle structure.

In FIG. 1, the number 1 indicates the cylindrical wall of the apparatus, which is closed at the ends with two covers 2 and 3 and which is supported on feet 4 and 5. The gaseous medium can be supplied through the inlet branch 6, while the remaining gases are removed through the branch 7. A coiled pipe 8 is so wound about the casing that one of the connecting flanges thereof is at 9 and the other at 10. The sublimate which has melted following precipitation can be drained through the branch 11. A heating element 12 is so introduced through the cover 2 that its end 13 rests in a sleeve 14 which is provided on a supporting plate 15. This plate is attached with three anchors 16, 17 and 18 to the end cover 3. These anchors furthermore bear at regular intervals a number of baffles 19, 20, 21, 22 and 23, of which the baffles with odd numbers have the shape as indicated in FIG. 4, while the baffles with even numbers have the shape as indicated in FIG. 3.

Figure 6:
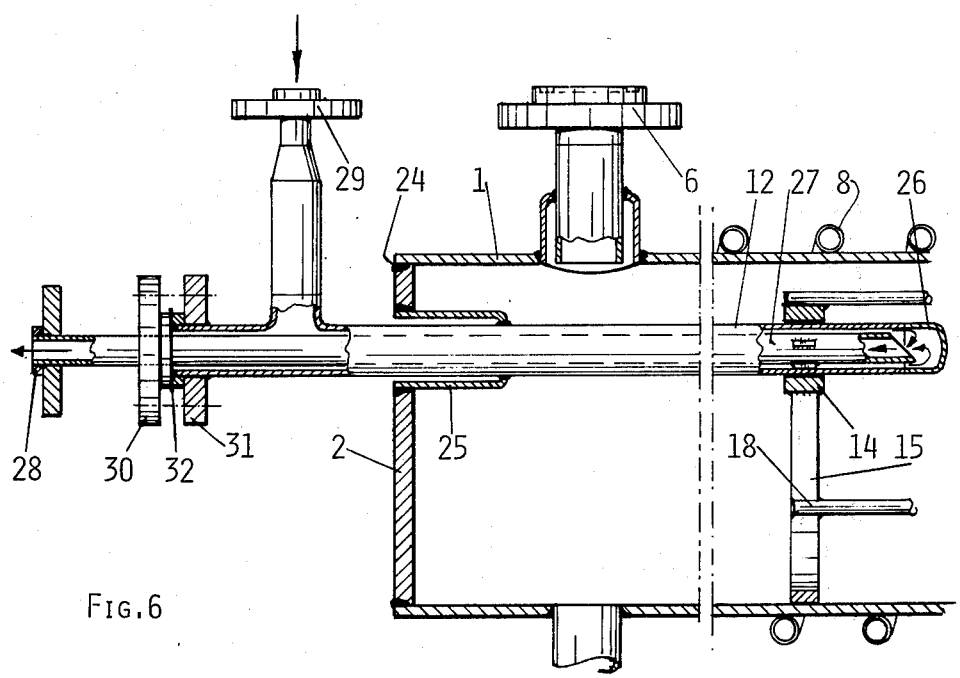
FIG. 6 shows a detail of the passage and the internal construction of the heating element.

Finally, FIG. 6 indicates in detail how the heating element 12 is passed through the end cover 2. This cover is welded securely with welded joints 24 into the cylindrical outer casing 1, while a cupped sleeve 25 is fixed similarly both to the cover 2 and to the heating element 12. An inner tube 27, which discharges through the connection 28 the heating medium supplied through the connection 29, is provided within the outer tube 12, which is closed at the end with a cap 26 that is welded thereon. The inner tube 27 is retained in its position by means of a pair of flanges 30 and 31 with the use of a bolt connection and of a packing ring 32 fitted between the flanges.

I claim:

1. Apparatus for separating sublimation product from a gas which contains this product in the form of vapour, comprising an elongate substantially horizontal casing having a gas inlet near one end and a gas outlet near the other end so that gas flows longitudinally through the casing; heat exchange means cooperating with the exterior of the wall of the casing for cooling said wall below the sublimation temperature during the subliming process, means for assuring that an open channel for gas flow is maintained during the subliming process, said means comprising at least one permanently heated, elongate, rod-shaped element fitted eccentrically in the casing, said element extending in the same direction as the casing and being placed in the upper part of the casing, said heating element being manufactured of a material having good heat-conducting properties and projecting into the casing through a wall portion over part of the length of the heating element so that heat can be supplied thereto from outside the casing, the end of the heating element which is located within the casing being supported on a baffle structure and said heating element comprising an inner tube disposed coaxially within an outer tube with an annular space therebetween, said outer tube being closed at the end located within the casing and said inner tube being open at the end located within the casing so that a heating medium can be supplied through the annular space between the tubes.

* * * * *